United States Patent
Ackley et al.

(10) Patent No.: US 6,945,547 B2
(45) Date of Patent: Sep. 20, 2005

(54) MULTI-LINK INDEPENDENT REAR SUSPENSION ASSEMBLY

(75) Inventors: Robert J. Ackley, South Lyon, MI (US); Ryan J. Suhre, Linden, MI (US)

(73) Assignee: Delphi Technologies, Inc., Troy, MI (US)

( * ) Notice: Subject to any disclaimer, the term of this patent is extended or adjusted under 35 U.S.C. 154(b) by 188 days.

(21) Appl. No.: 10/360,072

(22) Filed: Feb. 6, 2003

(65) Prior Publication Data

US 2004/0046349 A1 Mar. 11, 2004

Related U.S. Application Data

(60) Provisional application No. 60/409,371, filed on Sep. 9, 2002.

(51) Int. Cl.[7] .................................................. B60G 3/20
(52) U.S. Cl. ........................ 280/124.143; 280/124.153
(58) Field of Search ................... 280/124.135, 124.136, 280/124.138, 124.139, 124.143, 124.144, 124.148, 124.153, 86.757

(56) References Cited

U.S. PATENT DOCUMENTS

| | | | | |
|---|---|---|---|---|
| 4,556,238 A | * | 12/1985 | Matschinsky | 280/124.135 |
| 4,671,532 A | * | 6/1987 | Matschinsky et al. | 280/124.135 |
| 4,681,342 A | * | 7/1987 | Goerich | 280/124.143 |
| 4,832,363 A | * | 5/1989 | Mitobe | 280/124.143 |
| 4,903,981 A | * | 2/1990 | Alesso et al. | 280/124.139 |
| 5,000,477 A | * | 3/1991 | Minakawa et al. | 280/124.136 |
| 5,071,156 A | * | 12/1991 | Kanai et al. | 280/124.143 |
| 5,102,159 A |  | 4/1992 | Sato et al. | |
| 5,340,146 A | * | 8/1994 | Kato | 280/124.135 |
| 6,181,997 B1 |  | 1/2001 | Badenoch et al. | |
| 6,397,134 B1 |  | 5/2002 | Shal et al. | |

FOREIGN PATENT DOCUMENTS

| | | | | |
|---|---|---|---|---|
| DE | 4120894 A1 | * | 1/1993 | B60G/3/20 |
| FR | 2636569 | | 3/1990 | |
| FR | 2661138 | | 10/1991 | |

* cited by examiner

Primary Examiner—Peter C. English
(74) Attorney, Agent, or Firm—Michael D. Smith

(57) ABSTRACT

The invention provides a multi-link suspension assembly for a vehicle wheel, comprising a wheel carrier, an upper lateral link, a lower lateral link, a toe link, and a longitudinal link. The wheel carrier is oriented along a longitudinal axis of a vehicle body. The upper lateral link is oriented along a lateral axis of the vehicle body near the wheel center and is pivotally connected to the wheel carrier. The lower lateral link is oriented along a lateral axis of the vehicle body near the wheel center and is pivotally connected to the wheel carrier. The toe link is oriented along a lateral axis of the vehicle body behind the wheel center and is pivotally connected to the wheel carrier. The longitudinal link is oriented along the longitudinal axis of the vehicle body and is pivotally connected to the wheel carrier forward of the wheel center and pivotally connected to the lower lateral link near the wheel center.

10 Claims, 2 Drawing Sheets

MULTI-LINK INDEPENDENT REAR SUSPENSION ASSEMBLY

PRIORITY CLAIM

This application claims priority to a provisional application filed Sep. 9, 2002, application No. 60/409,371.

FIELD OF THE INVENTION

This invention relates generally to vehicle suspension assemblies. More specifically, the invention relates to a multi-link independent rear suspension assembly.

BACKGROUND OF THE INVENTION

Many different types of rear suspension systems have been developed. These include solid-axle dependent suspensions and independent suspensions. The solid-axle dependent suspensions are typically used on load-carrying vehicles such as trucks. These suspensions are strong and sturdy but produce a somewhat harsh ride. Independent suspensions, commonly installed in passenger cars, offer a smoother ride and better handling, but they can be less rugged than the solid-axle suspension.

In the past, virtually all trucks and utility vehicles were used for load carrying and other rough work and so came equipped with solid-axle suspensions. However, now that trucks and sport utility vehicles are being sold as luxury and recreational vehicles, the comfortable ride provided by an independent suspension has become increasingly important.

Independent suspension designs commonly used for rear suspensions include semi-trailing arms, A-arms, short-long arms (SLAs), three links, four links, and five links. Unfortunately, installing one of these existing independent suspensions into a vehicle designed for a solid-axle suspension can result in mechanical conflicts in placement of components such as the fuel tank, exhaust, frame, or spare tire. Either the vehicle or the independent suspension must be redesigned.

In addition to providing a smooth ride, the suspension system of a vehicle must perform several distinct functions: attach the wheels and tires to the vehicle; control tire position with respect to the vehicle body; maintain proper wheel alignment and location as the vehicle traverses bumps, potholes, and uneven road surfaces; stabilize the vehicle's attitude during acceleration, braking, and cornering; and transmit forces generated by the tires to direct vehicle motion.

An example of a force generated by the tires is the lateral force generated during turning when the tire pushes against the ground to change the direction of the vehicle. A suspension can be designed to turn the wheel in a certain direction and by a certain magnitude according to that lateral force. This effect is accomplished in a typical four-link suspension by engineering some flex or bend into the wheel carrier or knuckle. Because the wheel carrier is commonly a single metal blade, engineering in the desired amount of flex is complicated, and the part must often be relatively thin.

It would be desirable, therefore, to provide a multi-link independent rear suspension assembly that overcomes the aforementioned and other disadvantages.

SUMMARY OF THE INVENTION

One aspect of the invention is a multi-link suspension assembly for a vehicle wheel, comprising a wheel carrier, an upper lateral link, a lower lateral link, a toe link, and a longitudinal link. The wheel carrier is oriented along a longitudinal axis of a vehicle body. The upper lateral link is oriented along a lateral axis of the vehicle body near the wheel center and is pivotally connected to the wheel carrier. The lower lateral link is oriented along a lateral axis of the vehicle body near the wheel center and is pivotally connected to the wheel carrier. The toe link is oriented along a lateral axis of the vehicle body behind the wheel center and is pivotally connected to the wheel carrier. The longitudinal link is oriented along the longitudinal axis of the vehicle body and is pivotally connected to the wheel carrier forward of the wheel center and also pivotally connected to the lower lateral link near the wheel center.

Another aspect of the invention is a multi-link suspension assembly for a vehicle wheel, comprising a wheel carrier, a drop link, a longitudinal link, an upper lateral link, a toe link, and a lower lateral link. The drop link is pivotally connected to the wheel carrier. The longitudinal link is pivotally connected to the drop link. The upper lateral link is pivotally connected to the wheel carrier. The toe link is pivotally connected to the wheel carrier. The lower lateral link is pivotally connected to the wheel carrier and also pivotally connected to the longitudinal link. The wheel carrier pivots in response to a lateral force applied to the vehicle wheel.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

The invention comprises the arrangement of a multi-link vehicle suspension assembly. The assembly has been developed primarily for use as a direct replacement driven independent rear suspension module in a sport utility type vehicle but is also applicable to other vehicles.

Figure 1:
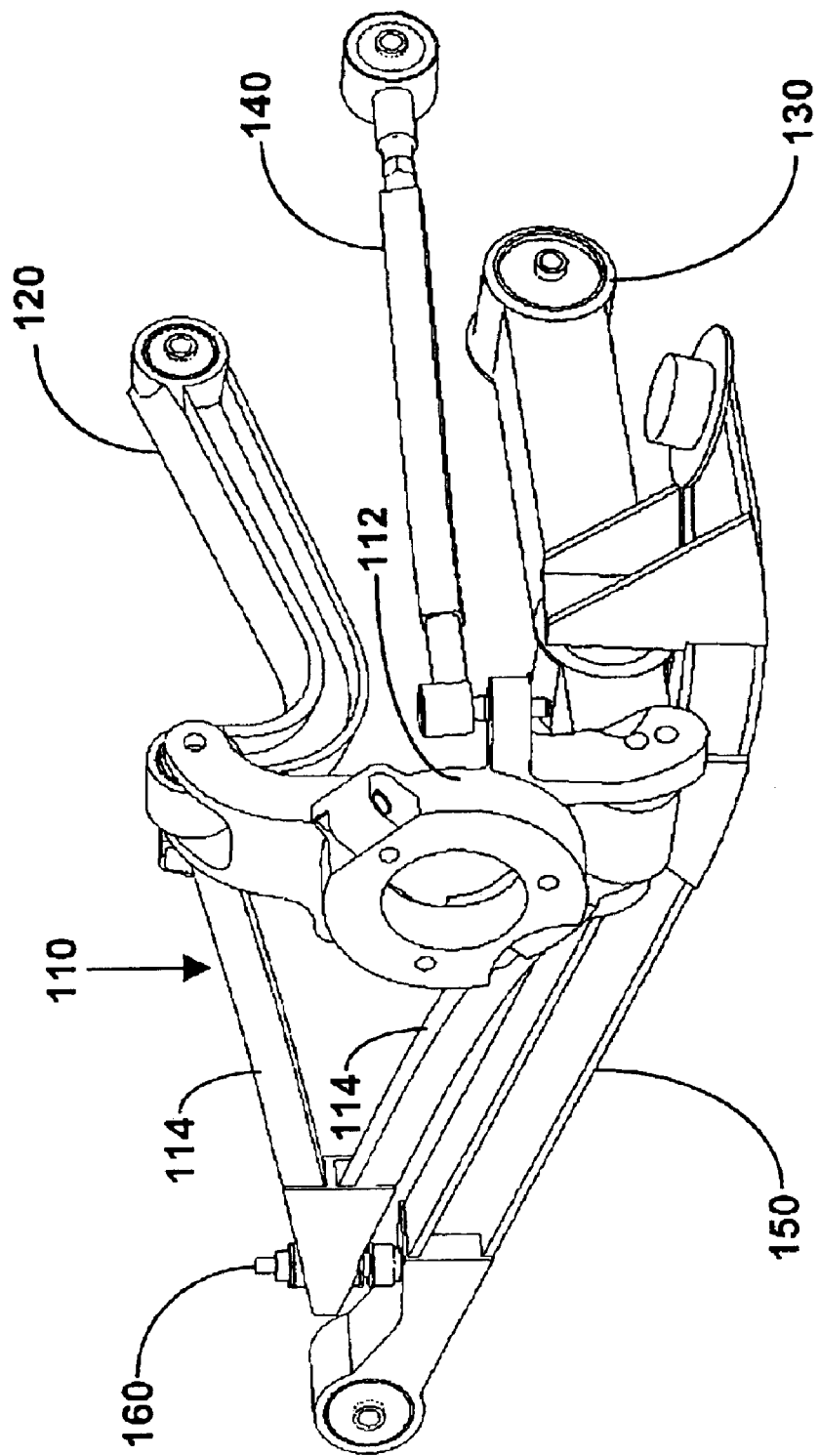
FIG. 1 is an illustration of one embodiment of multi-link suspension assembly viewed from the side of the vehicle, in accordance with the current invention.
Figure 2:
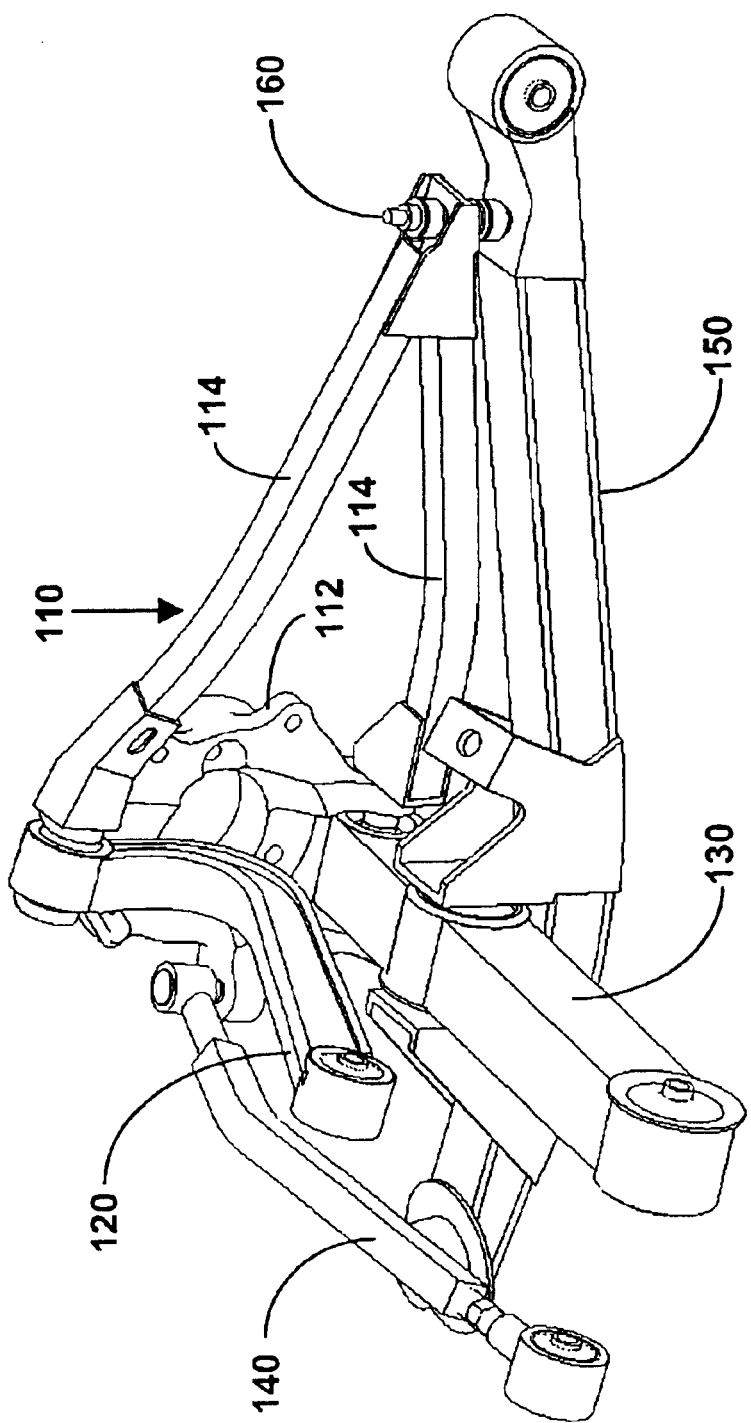
FIG. 2 is an illustration of the multi-link suspension assembly shown in FIG. 1, viewed from the center of the vehicle.

One embodiment of the assembly, in accordance with the present invention, is illustrated in FIG. 1, viewed from the side of the vehicle, and in FIG. 2, viewed from the center of the vehicle.

The multi-link suspension assembly shown in FIG. 1 and FIG. 2 comprises a wheel carrier 110, an upper lateral link 120, a lower lateral link 130, a toe link 140, and a longitudinal link 150. Wheel carrier 110 may include a wheel mount portion 112 and upper and lower arm portions 114 arranged in a triangular structure. Wheel carrier 110 and longitudinal link 150 may be pivotally connected through a drop link or bushing 160 having a generally vertical pivot axis. The assembly may be fabricated using one or more materials such as steel, aluminum, and a suitable substantially rigid material.

When the assembly is mounted on a vehicle, both wheel carrier 110 and longitudinal link 150 are oriented along a longitudinal axis of the vehicle body. Upper lateral link 120, lower lateral link 130, and toe link 140 are all oriented along a lateral axis of the vehicle body. Thus, upper lateral link 120, lower lateral link 130, and toe link 140 are positioned substantially perpendicular to wheel carrier 110 and longitudinal link 150.

Wheel carrier 110 may include a wheel mount portion 112 and two arm portions 114. Wheel mount portion 112 may be that portion of wheel carrier 110 to which the wheel is most directly attached. Wheel mount portion 112 may be formed by a process such as casting. The two arm portions 114 may extend from the wheel mount portion to form a substantially triangular structure. The arm portions 114 may be, for example, fabricated metal arms that are fixedly connected to each other and to wheel mount portion 112 such that the separate portions function as one. They may be connected using one or methods such as welding, bolting, crimping, and the like.

Both upper lateral link 120 and lower lateral link 130 are pivotally connected to wheel carrier 110 at positions near the center of a vehicle wheel mounted to the wheel carrier. Upper lateral link 120 is connected to the upper portion of wheel carrier 110, and lower lateral link 130 is connected to the lower portion of wheel carrier 110. Lower lateral link 130 is further pivotally connected to longitudinal link 150. Both upper lateral link 120 and lower lateral link 130 are pivotally connected to the vehicle body at the inner edge of each of the two links, the inner edge being the edge furthest from the wheel carrier and nearest the interior of the vehicle.

Upper lateral link 120 and lower lateral link 130 provide lateral stiffness and camber control of the wheel carrier. Camber is the angle between vertical (perpendicular to a flat road surface) and the "lean" of the wheel and tire mounted on the wheel carrier. Negative camber is often used to offset the normally positive change in camber as a wheel moves up. By controlling camber, the tire contact patch may be maximized through the complete range of suspension motion.

Toe link 140 is pivotally connected to the wheel carrier at a position behind the center of a vehicle wheel (i.e., toward the rear of the vehicle) when the wheel is mounted to the wheel carrier. Toe link 140 is also pivotally connected to the vehicle body at the inner edge of the link, the inner edge being the edge furthest from the wheel carrier and nearest the interior of the vehicle. Toe link 140 provides toe control of the wheel carrier. A toe-in or toe-out position may be pre-set into the suspension. In a toe-in position, the tires point slightly toward the center of the vehicle front. In a toe-out position, the tires point slightly away from the vehicle. Toe-in and toe-out positions are used to offset the natural change in toe position caused by braking and acceleration.

Longitudinal link 150 is pivotally connected to wheel carrier 110 forward of the vehicle wheel center (i.e., toward the front of the vehicle). Locating this connection far ahead of the wheel center, as shown in FIG. 1 and FIG. 2, may provide caster stiffness (side view rotational stiffness) of the wheel carrier. Longitudinal link 150 and wheel carrier 110 may be linked through a drop link or bushing 160 that provides a low lateral rate. The forward edge (i.e., the edge nearest the front of the vehicle) of longitudinal link 150 may be pivotally connected to the vehicle body.

Wheel carrier 110 may pivot in response to a lateral force applied to the vehicle wheel, for example the force experienced when a vehicle is cornering. The wheel carrier 110 may pivot about the drop link or bushing 160 and also about the location where the lower lateral link 130 is connected to both the wheel carrier 110 and the longitudinal link 150. The vehicle wheel attached to wheel carrier 110 may turn in a certain direction and by a certain magnitude when the wheel carrier pivots. Thus the suspension may steer the wheel slightly in response to the lateral force. The multiple pivoting links and the design of the wheel carrier may permit greater ease and precision in engineering this steering effect than is possible with a suspension having only a single connection for the lower lateral link or having a wheel carrier formed using a single metal blade.

For example, when a vehicle is cornering, a lateral force is applied to the vehicle tire when the tire pushes against the ground to change the direction of the vehicle. This force is then transmitted to wheel carrier 110 and, through the wheel carrier, to the suspension. With the present invention, wheel carrier 110 is able to pivot about drop link 160, moving laterally in the vehicle and, in effect, steering the wheel. By having wheel carrier 110 also pivotally connected to lower lateral link 130, which is in turn pivotally connected to longitudinal link 150, the wheel carrier has additional freedom to pivot.

In a typical four-link suspension, wheel carrier 110 and longitudinal link 150 are combined to form a single part that acts as the wheel carrier. This single part lacks the pivotal connection provided in the present invention by drop link 160 and the dual connections of lower lateral link 130. The wheel carrier of a typical four-link suspension is able to turn the attached wheel only if a certain degree of flex or bend is engineered into the wheel carrier. Because a typical four-link suspension wheel carrier is a single metal blade, engineering in the desired amount of flex is complicated and may be inexact.

In the present invention, the direction and magnitude of the turn that results from the pivoting of the wheel carrier may be engineered not just by manipulating the mechanical properties of the materials comprising the wheel carrier, but also by varying factors such as the lengths of the various links, the positions at which these links are connected, and the ratings of the pivotal connections, particularly the rating of drop link 160.

In practice, because of its compact longitudinal space along the axle and lower load floor, the invention can be packaged in vehicles originally designed for solid-axle suspensions with little or no change in placement of components such as the fuel tank, exhaust, frame, or spare tire. In addition, the invention has an open design, giving it a lower unsprung mass than a solid axle suspension or even a typical independent suspension with a one-piece, solid wheel carrier. The invention provides improved ride and handling over a solid-axle suspension while offering a vehicle manufacturer the ability to increase third row seat room or cargo volume through a load floor height reduction. The invention additionally provides enhanced kinematic and compliant tuning ability.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

What is claimed is:

1. A multi-link suspension assembly for a vehicle wheel, comprising:

a wheel mount, the wheel mount oriented along a longitudinal axis of a vehicle body;

an upper lateral link, the upper lateral link oriented along a lateral axis of the vehicle body near a wheel center, the upper lateral link pivotally connected to the wheel mount;

a lower lateral link, the lower lateral link oriented along a lateral axis of the vehicle body near the wheel center, the lower lateral link pivotally connected to the wheel mount;

a toe link, the toe link oriented along a lateral axis of the vehicle body behind the wheel center, the toe link pivotally connected to the wheel mount;

a longitudinal link, the longitudinal link oriented along a longitudinal axis of the vehicle body, the longitudinal link pivotally connected to the lower lateral link near the wheel center;

an upper arm portion connected at one end to the wheel mount near the upper lateral link and having a remote end spaced apart from the wheel mount; and a lower arm portion connected at one end to the wheel mount near the lower lateral link and arranged with the upper arm portion and the wheel mount in a triangular structure, said lower arm portion having a remote end spaced apart from the wheel mount, whereby said upper arm portion, said lower arm portion and said wheel mount cooperate to form a wheel carrier; and a drop link having a generally vertical pivot axis and pivotally connecting the remote ends of the upper arm portion and the lower arm portion to the longitudinal link at a point spaced apart from the wheel mount.

2. The assembly of claim 1 wherein the upper and lower lateral links provide lateral stiffness of the wheel carrier.

3. The assembly of claim 1 wherein the upper and lower lateral links are configurable to control the camber of the wheel carrier.

4. The assembly of claim 1 wherein the toe link provides toe control of the wheel carrier.

5. The assembly of claim 1 wherein an inner edge of each of the upper lateral link, the lower lateral link, and the toe link is separately and pivotally connected to the vehicle body.

6. The assembly of claim 1 wherein a forward edge of the longitudinal link is pivotally connected to the vehicle body.

7. The assembly of claim 1 wherein the wheel mount pivots in response to a lateral force applied to the vehicle wheel.

8. The assembly of claim 7 wherein the vehicle wheel turns when the wheel mount pivots.

9. The assembly of claim 1 wherein the wheel mount is connected to the upper arm portion and to the lower arm portion using one or more methods selected from the group consisting of welding, bolting, and crimping.

10. The assembly of claim 1 wherein the assembly is fabricated using one or more materials selected from the group consisting of steel, and aluminum.

* * * * *